United States Patent Office 3,494,960
Patented Feb. 10, 1970

3,494,960
3-(2,6-DICHLOROISOTHIOBENZAMIDO)
PROPANE SULFONIC ACID
Jan Johannes Van Daalen, Weesp, and Johannes Wijma and Jasper Daams, Emmasingel, Eindhoven, Netherlands, assignors to U.S. Philips Corporation, New York, N.Y., a corporation of Delaware
No Drawing. Filed Nov. 2, 1966, Ser. No. 591,441
Claims priority, application Netherlands, Nov. 5, 1965, 6514351
Int. Cl. A01n 9/14; C07c 143/58, 143/40
U.S. Cl. 260—508                             1 Claim The invention relates to a novel compound of the formula 3-(2,6-dichloroisothiobenzamido) propane sulphonic acid. To this compound may be ascribed one of the two formulae:

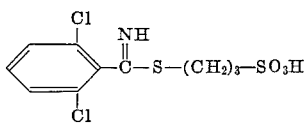

or:

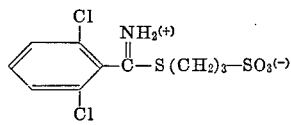

Apart from a pre-emergence herbicidal activity the compound has a fairly strong post-emergence herbicidal effect. This means that the compound is suitable for killing or damaging seeds of various plants and weeds in a state of germination and plants or weeds grown up to 5 to 10 cms.

It has been found that above the ground no germination or only slight germination could be seen on fields containing seeds of wild mustard, annual meadow grass, chickweed, spurry, millet and cress when the soil was sprayed with a solution of the active substance in acetone in a dosage corresponding to 1 to 10 kgs. of said compound per hector. When plants 5 to 10 cms. high of chickweed, blackgrass, amarintus stinging nettle, sugar beet, groundsel were sprayed with a solution of said active compound in a dosage of 3 to 5 kgs. of active substance per hectar, the plants were found to be damaged moderately to strongly. Also wild oats and lambs quarters exhibited damage of the leaves by similar experiments, though to a lesser extent.

On the basis of these properties the novel compound may be employed for combating different plants and weeds, both in the state of germination or a slightly later stage.

A striking herbicidal effect is obtained after the emergence of the weeds. The composition is then particularly suitable for combating wild oats, camomilla, groundsel, small stinging nettle in a dose corresponding to about 1 kg. of active compound per hectar.

It has furthermore been found that the composition has a satisfactory selective effect in the following cultivated plants: beans, colerape seed, wheat and maize. These results were obtained by post-emergence application in a dose corresponding to about 1.5 kgs. of active compound per hectar.

An additional advantage of the compound is the low evaporation value. This permits of applying the compound also in hotter climates in a cheap manner, that is to say in the form of aqueous dispersions to the plants or weeds to be combated or to the soil to be treated. In general, the compound according to the invention may be applied in a dosis of 1 to 10 kgs. of active compound per hectar.

The substance is furthermore satisfactorily soluble in water, so that the composition may also be employed for attacking deeply rooting weeds.

For practical use the conventional forms may be chosen, for example, miscible oils, dusts, wettables or granules. Particularly granules and wettables have found to be suitable.

For preparing miscible oils the active compound is dissolved in an appropriate solvent, which is sparingly soluble in water to which solution is added an emulsifier. A suitable solvent is, for example, dimethyl sulfoxyde, anisol or phenyl-cellosolve. Suitable emulsifiers are inter alia alkylphenoxyglycolethers, polyoxyethylene sorbitane esters of fatty acids or polyoxyethylene sorbitol esters of fatty acids. A certain number of these types of emulsifiers are known under the tradename of "Triton," "Tween" and "Atlox."

The concentration of the active compound in a liquid sparingly soluble in water is not subjected to narrow limits. It may vary between 2 and 30% by weight. Before use the miscible oils are emulsified in water and the resultant emulsion is sprayed out. In these aqueous emulsions the concentration of the active compound usually lies between 0.01 and 0.5 by weight.

Wettables may be prepared by mixing the active compound with a solid inert carrier and by grinding the mixture, usually in the presence of a disperging and/or wetting agent. Before use the wettables are dispersed in a liquid, preferably water and this dispersion is sprayed.

Suitable carrier material may be pipe clay, diathomoceous earth, kaolin, dolomite, talcum, gypsum, chalk, bentonite, attapulgite, kieselguhr, celite, wood flour, tobaco dust or ground coconut shells. Suitable dispersing agents are lignine sulphonates, and naphthalene sulphonates. Wetting agents may be fatty alcohol sulphates, alkylaryl-sulphonates or fatty acid condensation products, for example those known under the tradename of "Igepon."

The concentration in the wettables is not subjected to any limits. In general, the concentration will be chosen between 10 and 50% by weight.

Dusts may be prepared by applying the active compound as such or as a solution to solid carrier material. The resultant preparation is sprayed in the air in a dry, fine powdery state. When suitable, light-weight carrier material is chosen, these dusts may be prepared as an alternative in the manner described for the preparation of wettables. Suitable carrier materials are those mentioned above for the preparation of wettables. The concentration of active compounds in the dusts is usually lower than that of the wettables or miscible oils, but it is higher than the concentration of active compounds in dispersions or emulsions obtained by diluting wettables or miscible oils with liquids. The dusts contain frequently 1 to 20% by weight of active substance.

It has been found that wettables are particularly suitable for carrying the invention into effect.

The compound according to the invention can be produced by reacting 2,6-dichlorothiobenzamide in a solution with about equimolar quantities of propanesultone. The reaction is preferably carried out in the presence of an indifferent solvent. For this purpose may be employed the conventional solvents such as liquid aliphatic hydrocarbons having a boiling point region between 60° C. and 140° C. Further suitable solvents are found to be aromatic or alicyclic hydrocarbons such as benzene, toluene or cyclohexane.

The reaction is preferably carried out at a higher temperature, that is to say between about 60° C. and 200° C.

EXAMPLE 1

To a solution of 41.2 gs. of 2,6-dichlorothiobenzamide (0.2 mol), dissolved in 250 mls. of toluene, was added 24.4 gs. (0.2 mol) of propanesultone. The solution was boiled for three and a half hours. The resultant product slowly crystallized during the reaction. After filtering and drying 57.7 gs. of the product was obtained; it had a melting range from 247° C. to 248° C.; yield 85% of the theoretical value.

EXAMPLE 2

A wettable was made, which contained 50% of active substance 3 - (2,6 - dichloroisothiobenzamido) - propane sulphonic acid-1). The powder was mixed with water and sprayed in a quantity of 3 kgs./hectar, calculated on the quantity of wettable, in a quantity of liquid of 1000 litres/hectar on test fields planted four weeks earlier with young weeds and cultivated plants. Two weeks after spraying serious damage was found with the weeds: avena fatua, matricarix inodora, senecio and urtica, whereas no damage was found on the cutlivated plants; phaseolis, brassica napus, linum triticum, aestivum and zea-maize.

What is claimed is:
1. 3 - (2,6 - dichloroisothiobenzamido) propane sulphonic acid-1 having the following structural formulae:

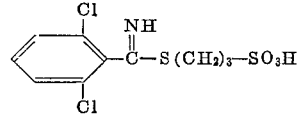

or

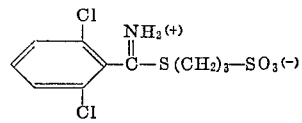

References Cited

Yates et al., Chemical Abstracts 65, 3804c (1966).
Philips, Chemical Abstracts 65, 3805a (1966).

DANIEL D. HORWITZ, Primary Examiner

U.S. Cl. X.R.
71—98